Figure 1:
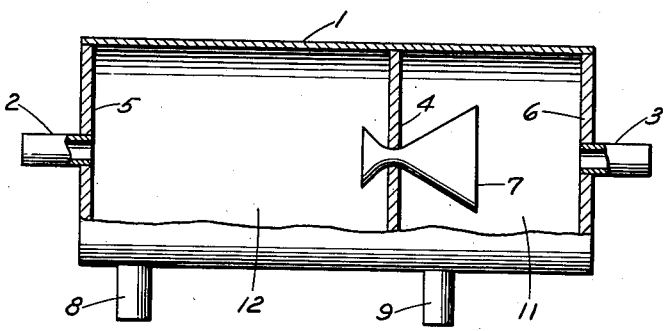

March 10, 1953  D. L. HOPPER ET AL  2,630,878
MIST FILTER
Filed May 29, 1947

INVENTORS
Harry E. Criner &
BY Dwight L. Hopper

Patented Mar. 10, 1953

2,630,878

UNITED STATES PATENT OFFICE 2,630,878

MIST FILTER

Dwight L. Hopper, Jacksonville, Ill., and Harry E. Criner, Pittsburgh, Pa., assignors to the United States of America as represented by the United States Atomic Energy Commission Application May 29, 1947, Serial No. 751,182

3 Claims. (Cl. 183—45)

Our invention relates to filters, and more particularly to mist filters for removing suspended particles of solids or liquids from gases containing the same, and is especially useful in filtering the outputs of vacuum pumps, gas compressors, and the like. This invention is an improvement over that set forth in the copending application of Rose et al. Ser. No. 741,618, filed April 15, 1947.

In the operation of vacuum pumps and other equipment it is desirable to collect, remove, or recover oil, or other liquids which may be in the form of mist. Oil mist from the discharge side of vacuum pumps is very difficult to remove. It has been found that the mist which settles on the walls of the discharge piping will reduce the effective pipe diameter and will increase the pressure drop through the pipe. Where the oil is expensive, such as the better grades of seal oil lubricants used in pumps, failure to reclaim such oil from the exhaust vapors may result in considerable waste. Again the chemical or physical makeup of the oil or other liquids or solids of the mist may be harmful to apparatus, materials or individuals on the discharge side or at the discharge end, and this is particularly true where the mist is discharged into open rooms with occupants or materials which may be adversely affected.

Gas compression through valve parts and other close-fitting parts causes a certain amount of seal oil to be "atomized" into small oil droplets varying in size over a wide range of droplet diameters. Large drops are comparatively easy to remove by baffle plates and the like. For efficient removal of very small oil droplets, extraordinary types of filters are required. The Precipitron, an electrostatic type of filter, is a very efficient type of mist extractor. However, it is complicated and often not suitable for certain types of work where the mist must be efficiently extracted at low gas pressures. Mist made up of electric conducting oil particles also introduces insulating problems in that type of filter. Examples of further attempts to provide an adequate mist filter may be found in the following patents: Ranyard 1,559,456 and Niven 1,874,587.

Applicants with a knowledge of all of these objections to and defects in the prior art have for an object of their invention the provision of a filter which will efficiently remove oil and other materials from mist containing the same.

Applicants have as another object of their invention the provision of a mist filter for removing oil mist from pumps, compressors, and the like, where a very expensive seal oil lubricant is used and where the conserving of such oil prevents costly waste.

Applicants have as another object of their invention the provision of a simple and compact mist filter for pumps and the like to prevent contamination of discharge pipes and other apparatus.

Applicants have as a further object of their invention the provision of a mist filter which is highly efficient over a wide range of different pressures to remove and recover suspended particles such as oils from gases.

Applicants have as a still further object of their invention the provision of a mist filter of small size and large capacity which may be quickly and easily constructed and which operates without moving parts to provide efficient recovery of particles such as oils from gases.

Applicants have as a still further object of their invention the provision of a mist filter whose use introduces only a moderate pressure drop in the system.

Applicants have as a still further object of their invention the provision of a mist filter having an improved nozzle for more completely and efficiently removing oil from gases passing therethrough.

Other objects and advantages of our invention will appear from the following specification and accompanying drawings, and the novel features thereof will be particularly pointed out in the annexed claims.

Figures 2, 4:
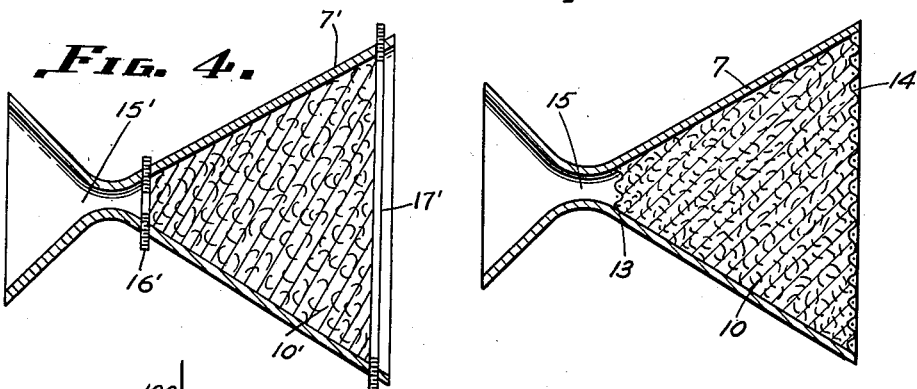
Figure 3:
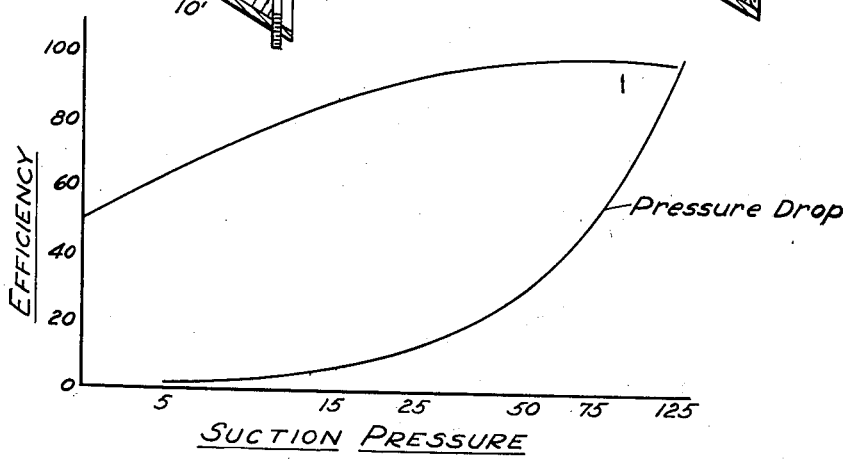

In the drawings, Fig. 1 is a sectional elevation of a mist filter incorporating our improved nozzle therein. Fig. 2 is a detail sectional view of one form of our improved filter nozzle. Fig. 3 is a graphical illustration of the effects of changing pressure on efficiency of operation of a filter with our improved nozzle incorporated therein. Fig. 4 is a detail sectional elevation of another form of our improved filter nozzle.

It has been found that the efficiency of a filter nozzle may be expressed by the following equation:

$$E = \frac{CW}{A\left(V - \sqrt{\frac{M}{Kd}}a\right)}$$

In the above equation E represents efficiency, C the proportionality constant, W the amount of oil passing a given section of the filter in unit time, A the nozzle area at the point examined, V the velocity of the air at area A, M the weight of the oil mist particle, K the factor depending upon the shape and size of oil mist particle, $d$ the density of air at area A, and $a$ the acceleration of the oil at area A.

Examination of this efficiency equation will show that as the ratio between the barrel or inside diameter of the filter and the nozzle diameter is increased, the efficiency will increase. For a barrel of given diameter it would then be necessary to decrease the nozzle diameter. It was discovered that a Venturi-type nozzle could most efficiently accomplish this result.

Referring to the drawings in detail, 1 designates a cylindrical casing or housing defining a barrel having ends 5, 6. An inlet pipe 2 and outlet pipe 3 carried by the ends 5, 6 serve to feed gases to and remove them from the casing 1. Disposed within the casing 1 and interposed between the ends 5 and 6 is a partition element 4 which divides the filter into a primary expansion chamber 12 and a secondary expansion chamber 11. Carried by the central portion of the partition element 4 for communication between the primary expansion chamber 12 and the secondary expansion chamber 11 is a nozzle 7 of the Venturi type to be described more in detail hereinafter. Joined to the lower extremities of the walls of the primary chamber 12 and secondary chamber 11 are oil drain pipes 8 and 9 which may either be connected to two separate return lines or a single return line for recovering oil.

The Venturi tube type nozzle 7' is shown in detail in Fig. 4 wherein it is seen to be comprised of a pair of truncated cones joined through their smaller ends by a cylindrical portion and the enlarged portion on one side of the throat 15' is packed with nickel wool 10' or other appropriate fibrous material. A series of wires 16', 17' passing transversely through nozzle 7' at either end of the ball of wool serve to retain it in the nozzle and prevent its displacement or removal. The wire segments in passing transversely through the walls of the nozzle 7' have their end portions seated therein and interlocked, as by threads, therewith to prevent accidental removal. It is apparent that portions of the wires may be reduced to permit clearance with the threaded openings. In lieu of this construction wire meshes 13, 14 may be employed instead of wires, as shown in Fig. 2. In other respects the two constructions may be the same. The Venturi type of nozzle having the restricted throat portion therein, produces the following results:

(a) Accelerates the droplets as the mist passes through the small throat opening;

(b) Accelerates by forcing the mist to move around the wire strands placed in its path; and (c) By producing enough collisions with a surface so that the drops are finally collected on the surface.

The passage of the mist laden gas through the Venturi nozzle gives the gas a high velocity in the vicinity of the restricted portion of the nozzle and produces a temporary concentration of mist particles in the region of high gas acceleration. The concentration of the mist particles in a limited space promotes the consolidation of a large number of mist particles into a smaller number of particles or droplets of greater size which are more easily collected.

All three of the foregoing results are present in the Venturi type of nozzle. The small nozzle throat causes high acceleration producing filtering, while the velocity is decreased as the gas moves out into the flare and the latter two features are accomplished.

From the curve of Fig. 3 where efficiency is plotted against suction pressure in m. m. of Hg, it will be seen that high efficiency is obtained over a wide range and for the low pressures. The lower curve represents performance of the straight nozzle while the upper curve is for the nozzle of our invention. As a result, the barrels of wool ordinarily employed in the primary and secondary expansion chambers to assist the filters at low pressures may be entirely dispensed with. This makes the manufacture of the filter much easier and the precision much greater since a given weight of wool may be inserted in the nozzle to produce a known result. Heretofore, it has been necessary to measure the pressure drop on every nozzle.

While it is recognized that the high efficiency attainable with our invention might be realized with known filters having an almost infinite number of primary baffle plates, the size and cost of such a device would be practically prohibitive. The same is true of a very large wool-filled type of filter, but the barrel length would have to approach something in excess of 100 feet which would not be feasible.

Having thus described our invention, we claim:

1. A mist filter of the character described comprising a hollow cylindrical housing, a partition element disposed within said housing for dividing it into a primary and a secondary expansion chamber, means for feeding fluid to said primary expansion chamber, means for removing fluid from the secondary expansion chamber, a Venturi tube including a larger and a smaller truncated cone carried by the partition for providing a passage for the flow of fluid from the primary to the secondary expansion chamber, and fibrous material disposed within the larger truncated cone of said tube for removing mist from the fluid.

2. A mist filter of the character described comprising a hollow cylindrical housing, a partition disposed within the housing for dividing it into a primary and a secondary expansion chamber, means for feeding fluid to the primary expansion chamber, means for removing fluid from the secondary expansion chamber, a Venturi tube carried by the partition for providing a passage for the flow of fluid from the primary to the secondary expansion chamber, a fibrous material disposed within the Venturi tube for the removal of mist from the fluid, and means for retaining the fibrous material in place.

3. A mist filter of the character described comprising an elongated hollow cylindrical housing, a partition disposed within the housing and dividing it into a primary and a secondary expansion chamber, a line for feeding fluid to the primary expansion chamber, a line for removing fluid from the secondary expansion chamber, a Venturi tube carried by the partition element for providing a passage for the flow of fluid from the primary to the secondary expansion chamber, a fibrous material disposed within the Venturi tube for removing mist from fluid passing therethrough, means for retaining the fibrous material in place, and drain lines for removing collected mist from the primary and secondary expansion chambers.

DWIGHT L. HOPPER.
HARRY E. CRINER.

REFERENCES CITED

The following references are of record in the file of this patent:

UNITED STATES PATENTS

| Number | Name | Date |
| --- | --- | --- |
| 758,222 | Stone | Apr. 26, 1904 |
| 1,099,773 | Smith | June 9, 1914 |
| 2,087,688 | Johnson | July 20, 1937 |

FOREIGN PATENTS

| Number | Country | Date |
| --- | --- | --- |
| 587,316 | France | Apr. 16, 1925 |